(12) United States Patent
Dolub

(10) Patent No.: US 8,069,779 B2
(45) Date of Patent: Dec. 6, 2011

(54) DEVICE FOR CRACKING OPEN AND SEPARATING AN EGG

(76) Inventor: Carlos Alberto Dolub, Carmiel (IL)

( * ) Notice: Subject to any disclaimer, the term of this patent is extended or adjusted under 35 U.S.C. 154(b) by 683 days.

(21) Appl. No.: 12/047,740

(22) Filed: Mar. 13, 2008

(65) Prior Publication Data

US 2008/0160145 A1    Jul. 3, 2008

Related U.S. Application Data

(63) Continuation-in-part of application No. 10/477,975, filed on May 7, 2004, now Pat. No. 7,363,853.

(51) Int. Cl.
*A23J 1/081* (2006.01)
(52) U.S. Cl. .................... 99/582; 99/568; 99/577
(58) Field of Classification Search ............... 99/568, 99/577, 582
See application file for complete search history.

(56) References Cited

U.S. PATENT DOCUMENTS

| 2,589,408 A | 3/1952 | Le Boeuf |
| 4,068,573 A | 1/1978 | Romero |
| 4,137,837 A | 2/1979 | Warren |
| 4,542,584 A | 9/1985 | Talbot |
| 4,665,813 A | 5/1987 | Maisonneuve |
| 5,083,508 A | 1/1992 | Banks et al. |

*Primary Examiner* — Anthony Weier
(74) *Attorney, Agent, or Firm* — Smith Risley Tempel Santos LLC; Gregory Scott Smith

(57) ABSTRACT

A device for cracking open an egg is shown, having egg-size sensing means for determining the size of an egg positioned in the device, thereby providing for automatic calibration of the device to the specific size of an egg to be cracked. The calibration determines how much would the distance between the piercing members and the imaginary longitudinal axis of the egg be reduced before the piercing members stop their advancing towards the egg and start moving apart for cracking its shell open. The device can thus open eggs of different sizes, e.g. having widths between 40 and 50 millimeters, accurately without requiring special preparation or manual calibration. A method for cracking open an egg based on said device is also shown.

1 Claim, 9 Drawing Sheets

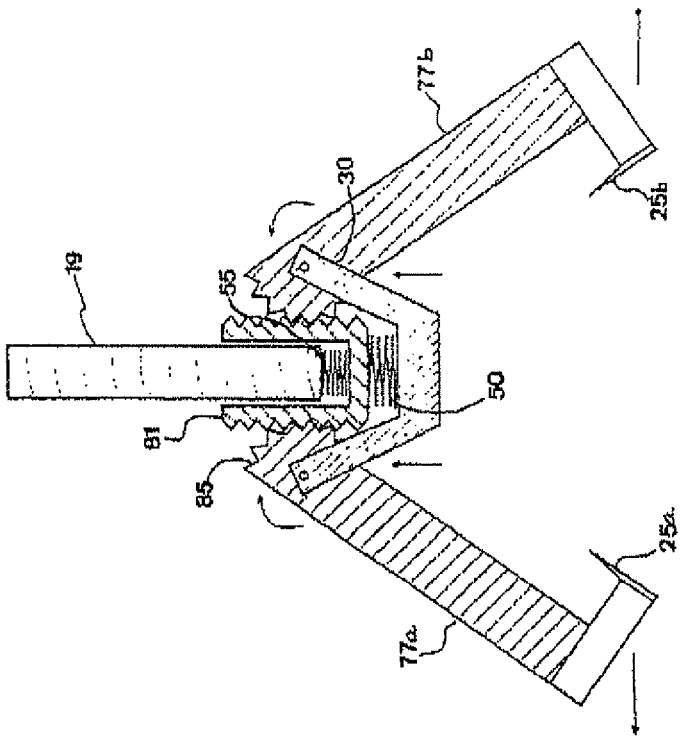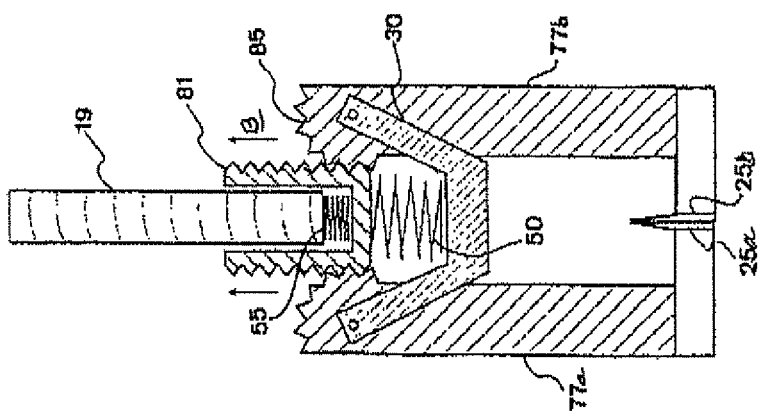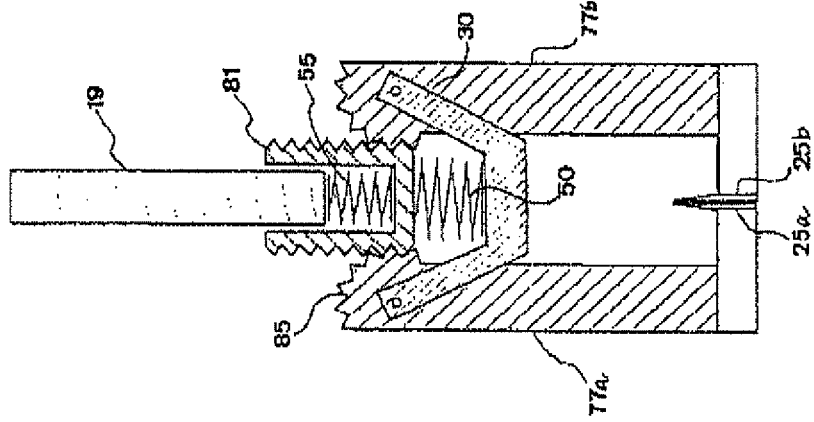

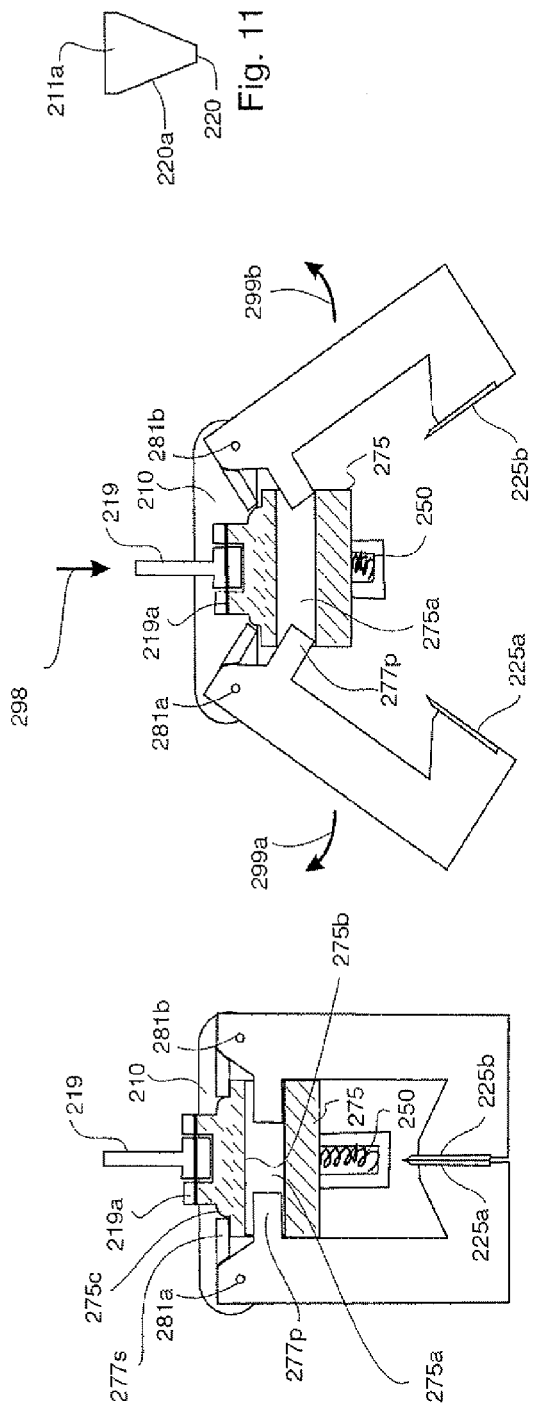

DEVICE FOR CRACKING OPEN AND SEPARATING AN EGG

The present application is based on and claims priority from U.S. patent application Ser. No. 10/477,975 filed May 7, 2004, the disclosure of which is hereby incorporated by reference in its entirety.

FIELD OF THE INVENTION

The present invention relates to the field of kitchen utensils. More specifically, the present invention relates to an improved method for cracking open an egg to obtain the contents therein and for separating the yolk of the egg from the white. The invention further relates to a device for carrying out said method.

BACKGROUND OF THE INVENTION

It is sometimes difficult and messy to crack open and egg, and, moreover, to separate the yolk of the egg from the white. Various egg-separating devices are known in the art that facilitate performance of this task including, U.S. Pat. No. 4,068,573 to Romero, U.S. Pat. No. 4,665,813 to Maisonneuve, and U.S. Pat. No. 5,083,508 to Banks et al.

A main concept followed by many devices for cracking open an egg is to penetrate the egg's shell by means of piercing members, and to spread its shell parts apart from the penetration area. One main problem, which has not yet fully been solved by the currently available devices, is suitability of the device to eggs of different sizes. Even though all eggs look the same, each has its own size, and therefore, the penetration of the piercing members of the egg cracking device into the egg's shell should start at a different distance between the piercing members and an imaginary longitudinal axis of the egg, per each egg size. Respectively, spreading the shell parts apart should start with a different distance between the piercing members and said imaginary axis of the egg per each egg size, i.e. immediately after the egg's shell has been penetrated. Further penetration should simultaneously be stopped in order to avoid smashing the shell and its contents. None of the available devices teaches how a device of a predetermined size can handle a range of different sizes of eggs, e.g. of widths between 40 and 50 millimeters, while independent of the egg's size, keeping an accurate correlation between stopping the penetration stage and starting the spreading apart stage.

It is therefore a main object of the present invention to provide a mechanism for automatically determining the size of an individual egg to be cracked and automatically calibrating the cracking device for matching the size of each such individual egg.

SUMMARY OF THE INVENTION

The present invention relates to methods for cracking open an egg to obtain the contents therein and for separating the egg yolk from the white (if desired) and further relates to devices for use in carrying out said methods. In a preferred embodiment of the invention, the device is adapted for cracking open an egg in three simple steps, leading to mess-free, and convenient opening of an egg without pieces of the shell remaining in the white or the yolk and without breakage of the yolk. The device is suitable for eggs of all different sizes. It will become evident from the description provided that the present invention provides an egg-cracking device far superior to those already known in the art both in its simplicity of use and in its efficiency.

In a first broad aspect, the invention relates to a method for cracking open an egg, comprising, positioning an egg in a gap between at least one sensing element and at least two piercing members;

reducing the gap until the sensing element contacts a surface of the egg;

further reducing the gap until the piercing members pierce into the egg;

translating the contact between the egg and the sensing element into activation of a catch mechanism for preventing further reduction in the gap and for converting such potential reduction into a separation between the piercing members useful for breaking a shell of the egg apart and releasing its content.

Referring to some specific embodiments of devices using the principles delineated by this specification, the method comprises:

placing an egg having a shell to be cracked in a device for cracking eggs such that a portion of the shell is located in a path along which piercing members of the device can move relative to the egg for penetrating its shell;

moving at least one egg-size sensing means against the shell of the egg (or moving the egg against the egg-size sensing means) until said sensing means contacts the shell, thereby determining an approximate location along a movement path of the piercing members towards the egg (or of the egg towards the piercing members) from which piercing into the shell is to be started;

restricting further movement of the piercing members or the egg along their movement path to a predetermined extent from said approximate location, thereby protecting the shell and the egg content from oversized movement of the piercing members towards the shell or vice versa;

penetrating the shell of said egg to a maximum extent not greater than said predetermined extent;

opening the shell of said egg so as to release the contents therein.

According to preferred embodiments of the present invention, the method further comprises the step of separating the yolk of the egg from the white of the egg.

Furthermore according to preferred embodiments of the present invention, the step of penetrating the shell of the egg is accomplished by two piercing members positioned adjacent to one another.

Moreover according to preferred embodiments of the present invention, the step of opening of the shell occurs when said piercing members are moved away from one another. They are configured to move away from one another only after a penetration into the shell for said predetermined extent has been effected. It is thus guaranteed that no opening will start before the shell has been prepared for the opening by a satisfactory piercing.

The present invention also relates to a device for cracking open an egg comprising handles for grasping and operating the device, holding means for holding an egg to be cracked in a predetermined position in the device, and a gripping, penetrating, and opening mechanism coupled to the handles and the holding means, for gripping said egg, for penetrating the shell of said egg, and for opening said shell so as to release the inner contents of the egg. The gripping, penetrating, and opening mechanism comprises;

a first arm and a second arm, wherein the arms are movable between a first position wherein the said arms are substantially parallel to one another and a second position wherein the arms are angled with respect to one another;

moving means for moving the first and second movable arms from the first position to the second position, wherein the moving means are actuated by the pushing together of the handles by a user;

a first piercing member and second piercing member protruding from the first and second movable arms, respectively, the first and second piercing members being positioned adjacent to one another when the arms are in the first position, and the piercing members moving apart from one another when the arms are moved to the second position.

The piercing members are positioned at a location below the holding means such that when an egg is positioned inside said holding means, the egg will be gripped, penetrated, and opened as the handles are pushed together.

According to preferred embodiments of the present invention, the holding means comprises a first ring and a second ring. The first and second rings are attached, e.g. at their lower ends, or at their sides, to the first and second movable arms, respectively.

Moreover according to preferred embodiments of the present invention, the device further comprises a sensing element configured for activating a mechanism for restricting the penetration of the piercing members to a predetermined piercing extent independent of the size of the egg, thereby facilitating gripping of the egg by the device and allowing separation of the piercing members from one another without further penetration.

Generally, the device for cracking open an egg according to the invention, comprises
 handles;
 at least two piercing members;
 at least one egg-size sensing means coupled to at least one of the handles for determining the size of an egg positioned in the device;
 a catch mechanism coupled to the egg-size sensing means for determining how much (upon pressing the handles together) the distance between the piercing members and an imaginary longitudinal axis of the egg should be reduced before the piercing members stop advancing toward the egg and start moving apart for cracking open the shell, thereby automatically calibrating the device to a specific size of an egg to be cracked.

In various embodiments, the sensing means comprises a sensing element hinged to an end portion of a handle and configured to pivot respective to said handle upon contacting a surface of an egg to be cracked.

In some embodiments the sensing element is provided with a lever advantage for translating a predetermined contact pressure force generated between the surface of the egg and the sensing element into a greater catch force in the catch mechanism.

Generally, in various preferred embodiments of the invention, the catch mechanism comprises a moving member configured to become immovably tethered to one of the handles in response to a contact pressure between the sensing means and a surface of an egg to be cracked, and with correlation between a tethering position and a size of the egg.

In some embodiments of the invention, the tethering is achieved by friction between the moving element and a catch element, or by mechanical engagement between a toothed surface and at least one matching protrusion or tooth. The moving element or the catch element can comprise the toothed surface or the matching protrusion or tooth, and vise versa.

Preferably devices of the invention are configured for cracking open eggs having widths between 40 and 50 millimeters with automatic calibration.

Preferably devices of the invention comprise a pair of ring shaped holders for capturing an egg to be cracked, wherein the rings are positioned in an inclined orientation to an imaginary longitudinal axis of an egg, such that a distance between apexes of said holders is greater than a distance between their bottom ends.

In various embodiments of the device, the sensing means comprises a sensing element, an edge of which being configured for pushing an egg to be cracked towards the piercing members upon pressing the handles together.

According to some preferred embodiments, the sensing element constitutes an end of a lever configured to contact the shell of the egg and to convert a small mechanical pressure exerted on it by the shell into a substantial force sufficient for switching the device from an initial mode of operation into an advanced mode. According to various preferred embodiments, the device is configured such that when positioning an egg to be cracked, its bottom is positioned right above the piercing members, and such that in the initial mode of operation, a user's pressure on the handles results in reducing a gap between a top of the egg and a sensing element located above the egg. According to some embodiments, the device is configured such that in the initial mode of operation, a user's pressure on the handles results in reducing a gap between the piercing members and a bottom surface of the egg, simultaneously with a reduction in the gap between the sensing element and the surface of the egg. In these embodiments, the sensing element is positioned in the device such that, when the gap between the piercing members and the surface of the egg is zeroed and the piercing members are about to or start piercing the shell, a contact between the surface of the egg and the sensing element is achieved. In some of such embodiments, the sensing element is located for contacting the egg surface in a location opposite the site of penetration, taking advantage of the substantial symmetry of most eggs about their longitudinal axis. This symmetry assumes that the sensing element and the piercing members contact the surface of the egg in approximate correlation if the egg is positioned in the device with its longitudinal axis in approximately similar distance from both the sensing element and the piercing members.

In most preferred embodiments, a contact with slight pressure between the sensing element and a surface of the egg makes the initial mode of operation switched into the advanced mode. In some preferred embodiments the switching is effected through a lever configured for providing a mechanical advantage for reducing the amount of contact pressure between the surface of the egg and the sensing element required for bringing and/or maintaining the device in the advanced mode of operation.

During the advanced mode of operation, the piercing into the shell of the egg is stopped, and further pressure on the handles will initiate a final mode of operation in which the arms of the device move to their second position, thus moving the piercing members apart from one another, thereby opening the shell.

According to another embodiment, the sensing element is a micro-switch configured to actuate an electromechanical latch (or klatch) for switching the device from an initial mode of operation into an advanced mode of operation. According to this embodiment, the device farther comprises a battery compartment for energizing the electromechanical component by an inherent battery.

According to embodiments of the invention, the activation of the device, that is switching it from the initial mode of operation into the advanced mode and in turn into the final mode, is accomplished by translating the contact pressure between the sensing element and the surface of the egg into a mechanical-catch or a catch-by-friction of a moving member, thereby tethering it to the influence of a holding means or a handle of the device during the advanced mode and the final mode. A linkage made between the moving element and the handle to which it becomes tethered is then utilized for driving an interaction between the piercing members and the shell of the egg in response to further movement of the holding means or handle. In some preferred embodiments the moving member is a screw, the threading of which is used as a means for catching by a catch element in the form of a plate with a hole (e.g. a flat ring). The screw can pass freely through the hole of the plate when the plate is oriented in a right angle to the screw, but is caught and becomes immovable to the plate when the plate is in a diagonal orientation to the screw. It can thus be appreciated that when the screw moves under the influence of a first handle of the device and the plate moves under the influence of a second handle of the device, the two handles will move free of a pressure between the screw and the plate whenever a right angle is kept between the screw and the plate. The sensing element is configured to govern the respective orientation between the plate and the screw, and thus, in case the plate changes its orientation to the screw under the influence of the sensing element, a catch will be achieved with no further relative motion between the screw and the plate. In this situation, and since one of either the plate or screw (preferably the plate) is formed substantially immovable to the handle carrying it, further movement of the handles will result in movement of the other of either the plate or screw (preferably the screw) respective to the handle carrying it. The respective movement thus enforced by the sensing element may be utilized for activating an advanced mode interaction and, in turn, a final mode interaction between the piercing members and the egg. Said activation will not occur during neutral movement of the handles, i.e. whenever a contact pressure is not exerted on the sensing element during its motion path.

According to the preferred embodiments, activation of the advanced mode and of the final mode of operation will occur, however, in the end of a neutral movement of the handles, in order to allow for cleaning the device. Preferably the device is configured to crack eggs of any width between about 40 and 50 millimeters, and thus the range covered by the sensing element is about 10 millimeters. When no contact with egg occurs along the range of motion of the sensing element when pushing the handles together, a self activation will occur by further bringing the handles closer, thereby facilitating cleaning of the device.

Additionally according to preferred embodiments of the present invention, the device further comprises a cup positioned below the holding means for receiving the yolk of an egg following the opening of the egg.

BRIEF DESCRIPTION OF THE DRAWINGS

The invention is now described, by way of example only, with reference to the accompanying drawings, wherein:

FIGS. 2A, 2B, and 2C are partial frontal views of the device of FIG. 1, showing the state of the device in three separate steps that occur in a method for cracking open and separating an egg, according to a preferred embodiment of the present invention.

FIG. 9 illustrates a partial front view of a screw mechanism constituting a part of the catch mechanism of FIG. 6.

FIG. 10 illustrates the partial front view of the screw mechanism of FIG. 9 the final mode of operation.

FIG. 11 illustrates a front view of the sensing element of the embodiment of FIG. 6.

FIG. 12 illustrate a front view of the elements interacting with the egg according to the embodiment of FIG. 6.

FIG. 13 illustrates a partial combined side and cross sectional view of a catch mechanism according to a third embodiment of the invention.

FIG. 14 illustrates the embodiment of FIG. 5 in the moment an egg to be cracked has been sensed by the sensing element and the catch mechanism has activated an advanced mode of operation.

DETAILED DESCRIPTION OF THE DRAWINGS

It is appreciated that the detailed description provided is intended only to illustrate and elucidate certain preferred embodiments of the present invention. It is in no way meant to limit the scope of the invention, as set out in the claims.

Figure 1:
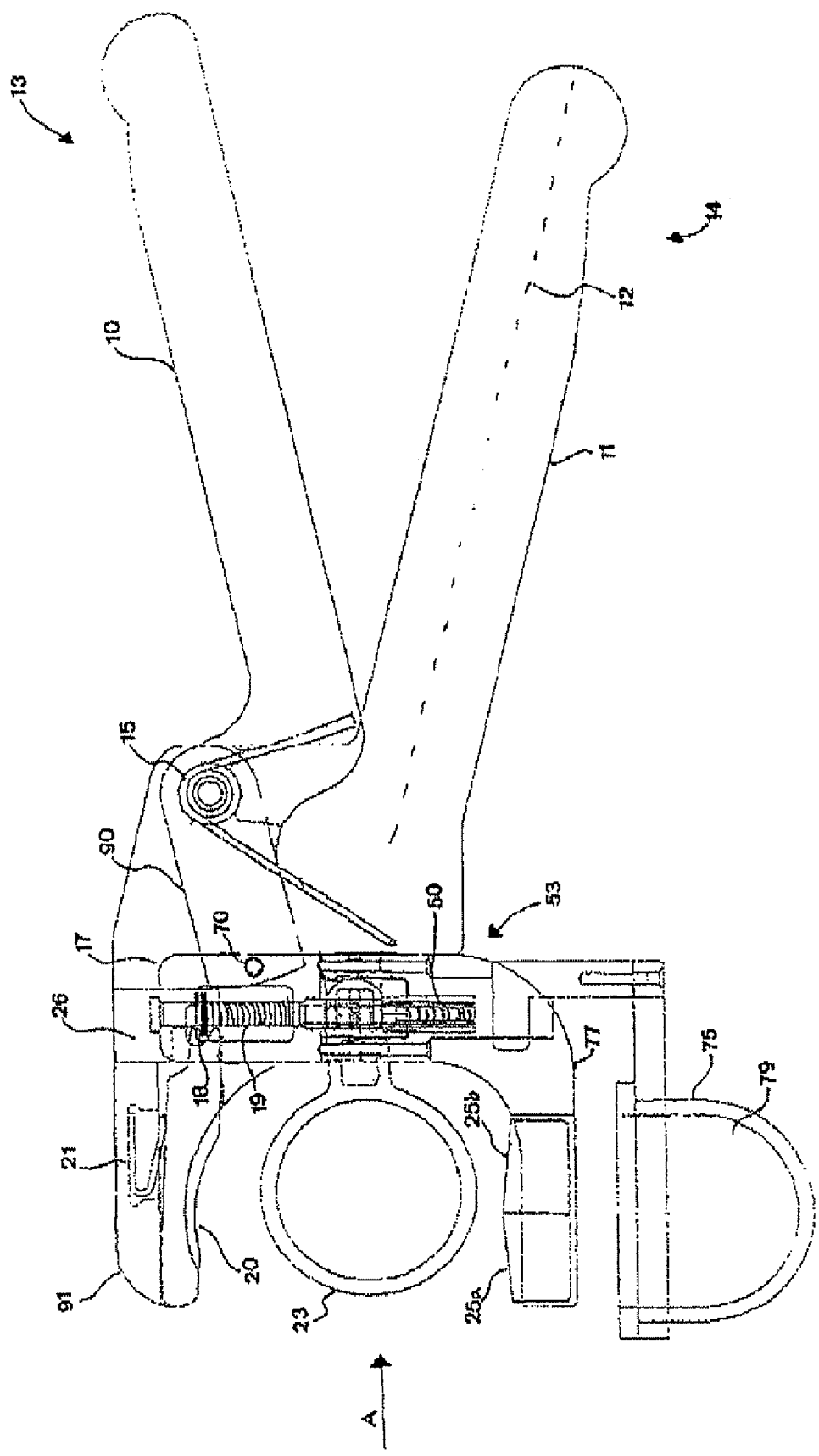
FIG. 1 is a side schematic view of a device for cracking open an egg, according to a preferred embodiment of the present invention.

Referring first to FIG. 1, the device of the present invention includes an upper handle (10) and a lower handle (11) for allowing gripping for operation of the device. The distal regions (13) (14) of the handles are designed to be gripped and pushed together by the user. The width of the lower handle (11) has a longitudinal depression (indicated by dotted line 12) on the upper surface thereof for receiving the upper handle (10) when said handles are pushed together. The proximal end (90) of the upper handle (10) is positioned inside the end region of said longitudinal depression and moves in the upward direction when the handles are pushed together by a user. The handles (10) (11) are pivotally connected to one another by pivot mechanism (15).

The proximal end (90) of the upper handle (10) is connected to a gripping, penetrating, and opening mechanism (53) via a screw mechanism (70). The central portion of the gripping, penetrating, and opening mechanism (53) contains a main screw (19), a screw housing (17), a protruding element (20), and a catch element (18). The catch element is engaged around the main screw (19) and prevents movement of said main screw (19) during penetrating, and opening of an egg. When the handles are gripped and pushed together by a user, the proximal end (90) of the upper handle (10) is raised, thereby causing the screw housing (17) to be raised in a corresponding manner. The mechanism (53) further includes a first arm (77) attached on one side of the bottom portion of the screw housing (17) and a second arm (not seen in FIG. 1) attached on the other side of the bottom of the screw housing. The arms preferably have a curved design, as shown in the illustration. Said arms are attached to the screw housing (17) in an outwardly rotatable manner that allows the arms to move from their initial, parallel alignment with respect to one another ("first position"), to an angled alignment ("second position"), as to be described further.

The lower portion of each arm contains an upwardly extending piercing member (25a) (25b). When the arms are in parallel alignment with one another, the piercing members are adjacent to one another and function to penetrate the shell of the egg in a manner to be described. When the arms are rotated outwardly, the piercing members move away from one another. This causes opening of the egg.

A first ring (23) and a juxtapositioned second ring (not seen in FIG. 1) are connected to the gripping, penetrating, and opening mechanism (53) and serve to hold an egg to be cracked in a predetermined position. The rings are preferably comprised of flexible material so as to accommodate eggs of varying sizes. The rings may be attached to the gripping, penetrating, and opening mechanism (53) at any location on the arms. As an example, in FIG. 1, ring (23) is attached to the vertically-extending section of arm (77). In other embodiments, said ring (23) may be attached to the lower, horizontally extending section of the arm (77). When the arms are rotated outwardly from the first position to the second position, the rings rotate in a corresponding manner to cause the release of the inner contents of the egg.

The device further comprises a protruding element (20) that protrudes from the lower surface of the proximal end of the lower handle (11). Said protruding element is coupled to the catch element (18) by a flexible member (21). When the handles are pushed together such that the protruding element (20) is brought in contact with the egg, the egg forces the protruding element (20) to shift position in the upward direction. The protruding element (20) then presses against the flexible member (21), thereby causing the catch element (18) to switch from an initial horizontal position to a diagonal position, and preventing movement of the main screw (19).

In some preferred embodiments, the device also comprises a cup (79) that is positioned below the arms and the rings. The cup (79) is preferably removably connected to the screw housing (17) at a portion of said screw housing that extends in the downward direction between the two arms. Said cup (79) is attached by any appropriate means, such as attachment member (75). The screw housing has an opening for receiving the end portion of said attachment member. The cup (79) is preferably used when the yolk of the egg needs to be separated from the white. In this case, following opening of the shell of the egg, the egg yolk falls into the cup while the egg white falls into a receiving vessel positioned below the device by the user.

FIGS. 2A, 2B, and 2C show partial frontal views of the device of Figure, from the vantage point of arrow (A) of FIG. 1, with some components eliminated from the device for the purposes of clarity so as to enable explanation of the gripping, penetrating, and opening mechanism of the device. In particular, it should be noted that the ring member and the screw housing are not shown in these Figures. The first arm (77a) and the second arm (77b) can be viewed along with the first piercing member (25a) and the second piercing member (25b) positioned at the lower portion of the arms (77a) (77b). In the embodiment shown, the arms (77a) (77b) are connected to one another by a connecting member (30). The main screw (19) of the gripping, penetrating, and opening mechanism can also be seen. The main screw (19) is positioned inside a toothed comb (81) that facilitates movement of the arms. The main screw (19) is coupled to the toothed comb (81) via a first spring (55). During operation of the device, upward movement of the screw housing (17) results in the downward force of the main screw (19) onto the first spring (55), so as to cause said spring (55) to change from a substantially expanded position (FIG. 2A) to a substantially compressed position (FIG. 2B). At the upper end of each arm (77a) (77b) is a toothed surface (85) that, along with a second spring (50) connected between the connecting member (30) and the toothed comb (81), facilitates outward rotation of the arms (77a) (77b).

Reference will now be made to FIG. 1 in combination with FIGS. 2A, 2B, and 2C, and to a method for cracking open and separating an egg. During operation of the device of the present invention, the user first places an egg to be cracked into position inside the two ring members. Each ring member is engaged around one end of the egg, leaving the central portion of the egg free for allowing penetration of the egg shell. When thus positioned, the egg is located directly above the piercing members (25a) (25b). Only one motion of pushing together the handles (10) (11) of the device is needed for completing cracking open and separating of an egg. However, since three events take place during this one motion, these three events will be described separately.

The first step that takes place when the user pushes the handles (10) (11) together is that all the components of the gripping, penetrating, and opening mechanism (53) move in the upward direction, with the exception of the catch element (18), which is prevented from moving due to openings on either side of the proximal end (91) of the lower handle (11) that engage said catch element (18). The main screw (19) as well as the screw housing (17) move upward through an opening (26) in the proximal region of the lower handle (11). This movement stops when the egg contacts the protruding element (20) located at the lower surface of proximal end (91) of the lower handle (11). When this happens, the force of the egg causes the protruding element (20) to shift upward slightly, which in turn causes the catch element (18) to move from its initial horizontal position to a diagonal position. Since the catch element (18) is engaged around the main screw (19), the diagonal repositioning of the catch element (18) prevents further movement of the main screw (19), At this stage, the egg has become gripped by the device. At this time, the components of the gripping, penetrating, and opening mechanism are in the configuration shown in FIG. 2A.

In the next stage, the screw housing (17) (as well as the arms and the rings, but not the main screw) continues to move in the upward direction (for a distance of about 3 mm, depending on the size of the spring (55) used), thereby causing the piercing members (25a) (25b) to penetrate the bottom of the shell of the egg. During this step, the upward movement of the screw housing (see arrow B of FIG. 2B) results in the compression of first spring (55) due to the force of the main screw (19) on said spring (see FIG. 2B). After the spring (55) is maximally compressed, the screw housing (17) cannot move upward anymore.

In the final stage, continued pressing together of the handles (10) (11) causes upward movement of the toothed surfaces (85) of the arms along the toothed comb (55). This movement results in the outward rotation (from the first position to the second position) of the arms (77a) (77b). FIG. 2C illustrates the arms in the second position. The piercing members (25a) (25b) separate from one another, causing opening of the egg and the release of the inner contents of the egg. When the cup (25) is in place, the yolk of the egg falls into the cup while the white falls into another receiving vessel positioned under the device by a user. Without the cup, the yolk and the white fall into the same receiving vessel.

Figure 3:
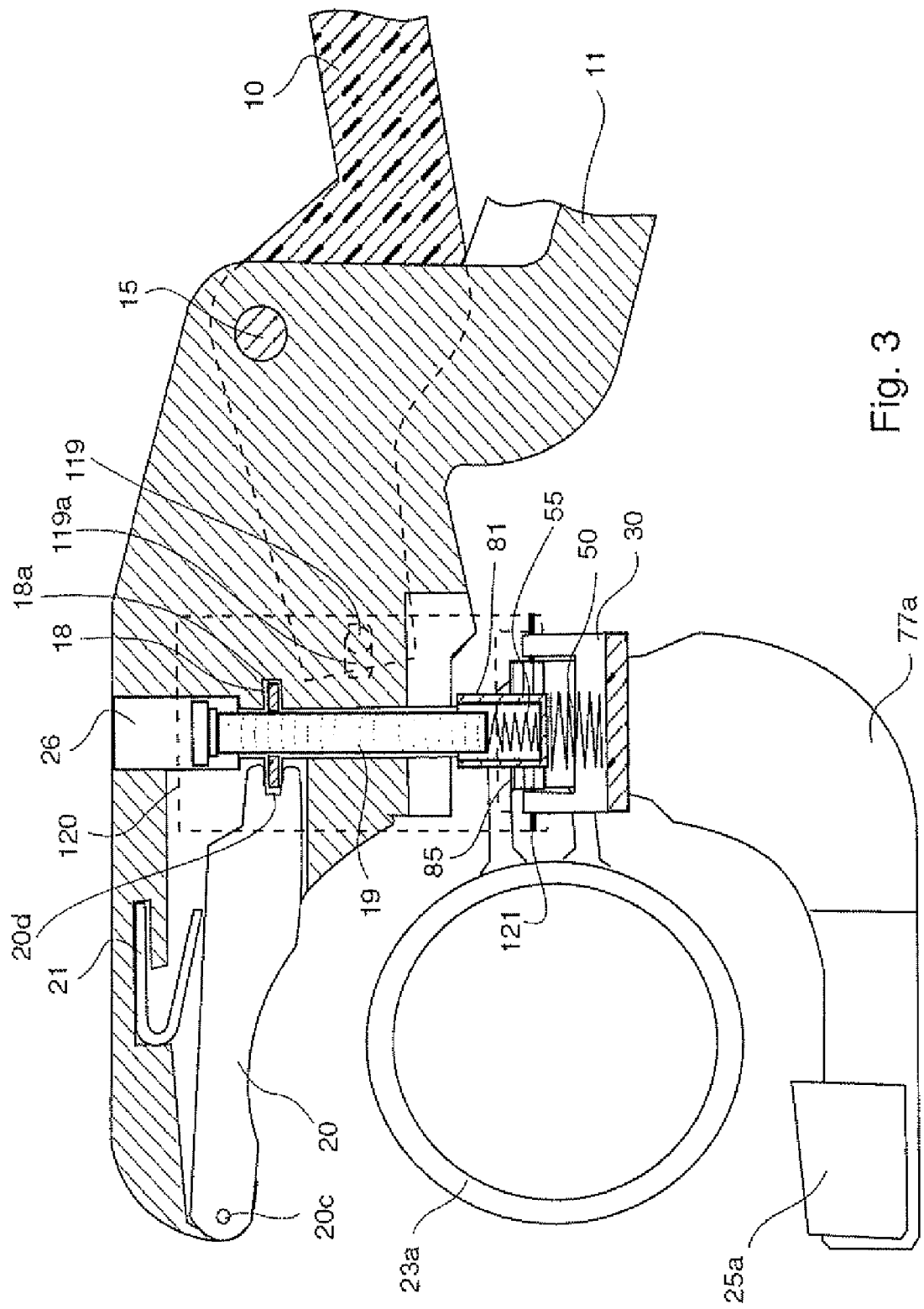
FIG. 3 is an enlarged side view of a catch mechanism according to a first embodiment of the present invention.

FIG. 3 is an enlarged side view of a catch mechanism according to a first embodiment of the present invention. A protruding element (20) constituting a sensing element for sensing the size of an egg to be cracked is hinged by a pin (20c) to a front end of a lower handle (11). A spring (21) located in the lower handle (11) presses the sensing element (20) downwards. On its end opposite to the hinge (20c) the sensing element has a groove (20d) by which it is coupled to a catch element (18). The catch element (18) is a plate having a through hole through which a screw (19) constituting a moving member can freely pass. An opening (26) formed in the handle (11) allows for free up and down movement of the screw (19) within a predetermined movement range. The range of movement is limited since the screw widens in its head, which prevents free passage of the screw through narrow ends of the opening (26). In its bottom end, the screw (19) seats on top of a first spring (55). The first spring (55) is accommodated in an internal space formed in a toothed comb (81). The teeth of the toothed comb (81) (shown in FIGS. 2A-2C) face outside and are geared to a matching toothed surface (85) located in a top portion of each of a pair of arms (77b) (not shown in this Figure), and (77a). The arms (77a) and (77b) are hinged each by a pin (121) to a carrier (120) which is movable up and down respective to the front portion of the handle (11). A connecting member (30) is located in the middle between the top portions of the arms (77a) and (77b) and is connected between the pins (121) about which the arms are hinged, respectively. A second spring (50) bridges a gap between a lower end of the connecting element (30) and a bottom of the toothed comb (81). The second spring (50) has a substantially greater compression coefficient then that of the first spring (51).

Figure 4:
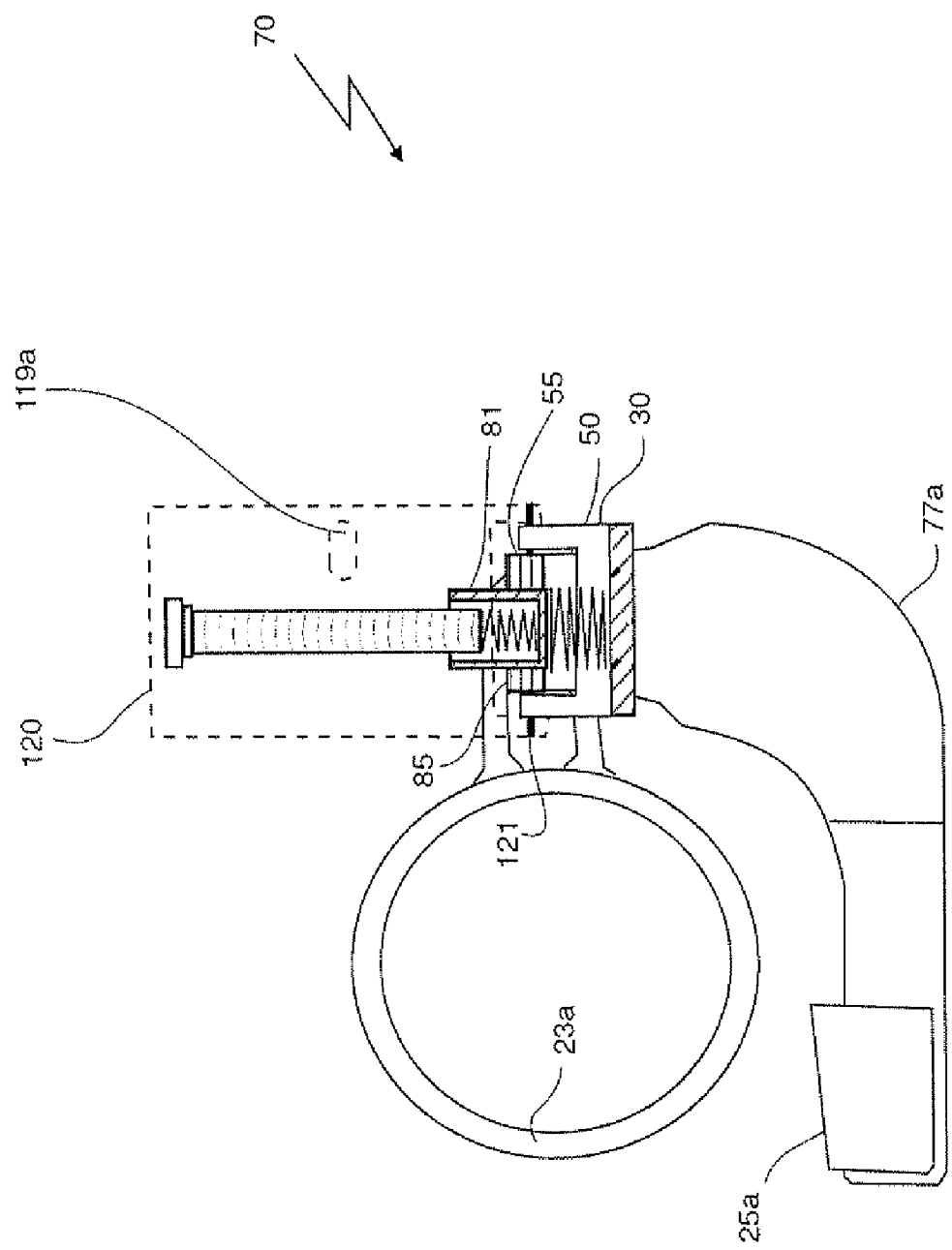
FIG. 4 is an enlarged side view of a screw mechanism which constitutes a part of the catch mechanism shown in FIG. 3.

Referring now to FIG. 4, in which the screw mechanism (70) is illustrated separately, it can be appreciated that if the carrier (120) will be forced upwardly, it will carry with it upwardly all of the other illustrated components of the screw mechanism, without a change in their mutual configuration and/or orientation. It can be appreciated however, that this unchanging mutuality will change in the event the upward movement of the screw (19) is prevented while the carrier (120) is forced upwardly. A description of the changes in the mutual configuration and/or orientation between the parts of the screw mechanism when the screw is immovable respective to handle (11) is given through FIGS. 2A-2C.

In the illustrated embodiment, the carrier (120) of the screw mechanism (70) is driven upwardly or downwardly upon pressing or releasing the handles (10)(11) to be respectively rotating about the main hinge (15), by pin (119) of the handle (10), which is coupled to the carrier (120) through a groove (119a).

As mentioned, in the situation depicted in FIG. 3, the screw (19) can freely move through the hole in the ring shaped plate (18), and thus pressing the handles (10) (11) together will not change the mutual orientations between the components of the screw mechanism. But this is only until the movement of the handles has reduced the existing gap between the top of the piercing members (25a)(25b) and the protruding element (20) so as an egg positioned between the first and second rings (23a)(23b) for cracking has been contacted by the protruding element (20) and pushed up against the biasing force provided by the flexible member (21), as is the situation depicted by FIG. 5.

Figure 5:
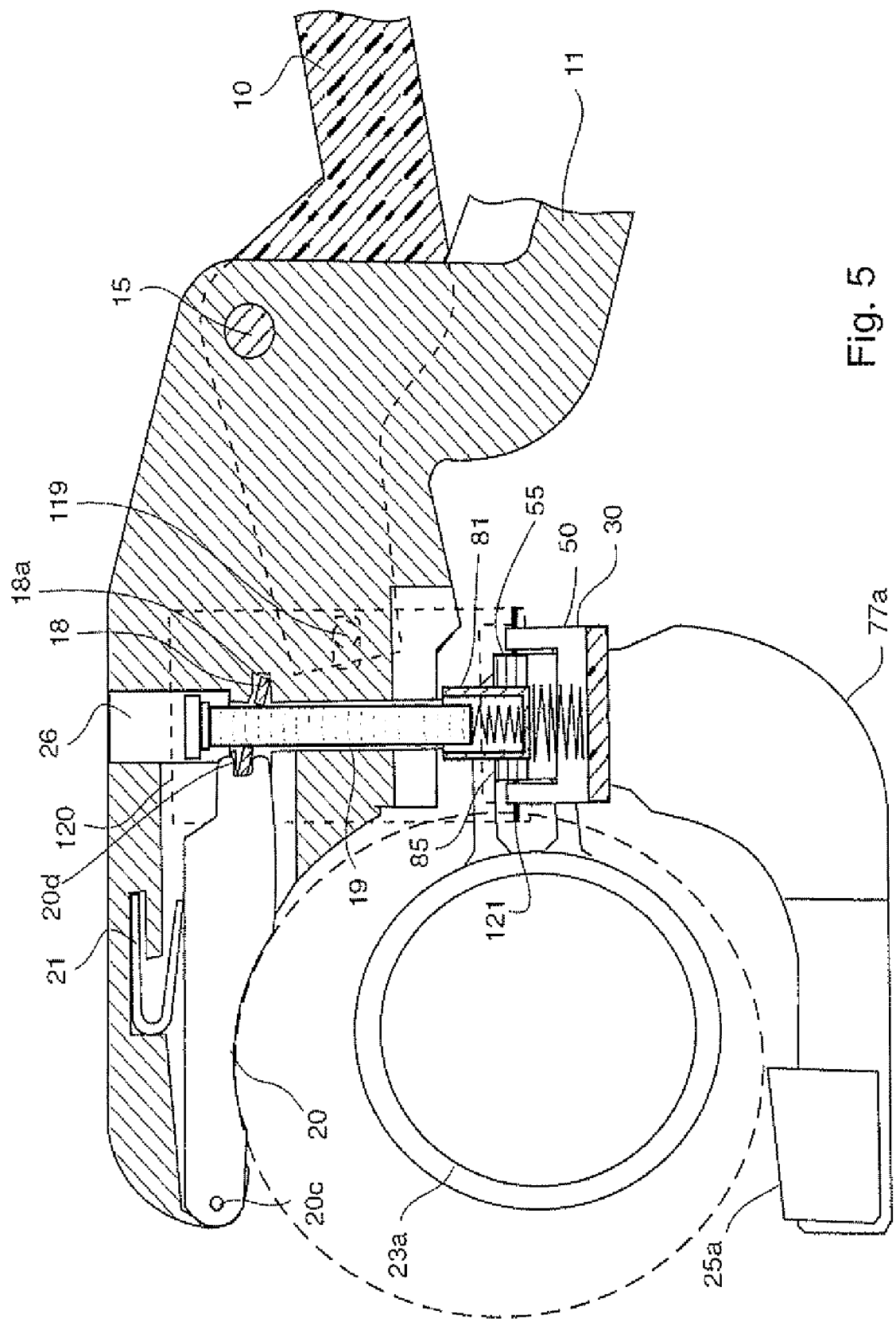
FIG. 5 illustrates the change in position of the catch mechanism of FIG. 3 in the moment an egg to be cracked has been sensed by the sensing element and the catch mechanism has switched for activating an advanced mode of operation.

FIG. 5 illustrates the change in position of the catch mechanism of FIG. 3 in the moment an egg to be cracked (105) has been sensed by the sensing element (20) and the catch mechanism has switched for activating an advanced mode of operation. The egg (105) exerts a slight pressure against the element (20), which is sufficient to push it against the biasing force of the flexible member (21) while pivoting about the hinging pin (20c). Due to the change in the position of the protruding element (20) in its role for "sensing" and recognizing to the device that the advanced mode of operation should start, the groove (20d) on its end drags the plate (18) to a diagonal orientation respective to the screw (19). The screw thus becomes immovable respective to the plate (18) as well as respective to the handle (11) in which the plate is implanted. Further elevation of the carrier (120) by further pressing together the handles (10)(11) will no more result in elevation of the screw (19) through the opening (26). It is appreciated that the elevation of the carrier (120) with the entire components of the screw mechanism (70) except the screw (19) itself, will result in an increasing pressure directed from the top of the first spring (55) to the bottom of the screw, which in turn will compress the spring (55), since the screw is now immovable. It is noted that compression of the first screw (50) will occur before compression of the second screw (50) since the latter is configured with a greater compression factor.

The compression of the screw (55) thus allows an additional few millimeters of elevation of the screw mechanism (except the screw (19) itself and the top of the spring (55) which stay immovable). Accordingly, the piercing members (25a)(25b) will move upwardly for the movement extent enabled due to the compression extent of the spring (55), and will pierce into the shell of the egg (105). However, the piercing members (25a)(25b) cannot pierce beyond said extent, since the currently immovable screw (19) and the now fully compressed screw (55) block any further upwardly movement of the toothed comb (81).

Figure 6:
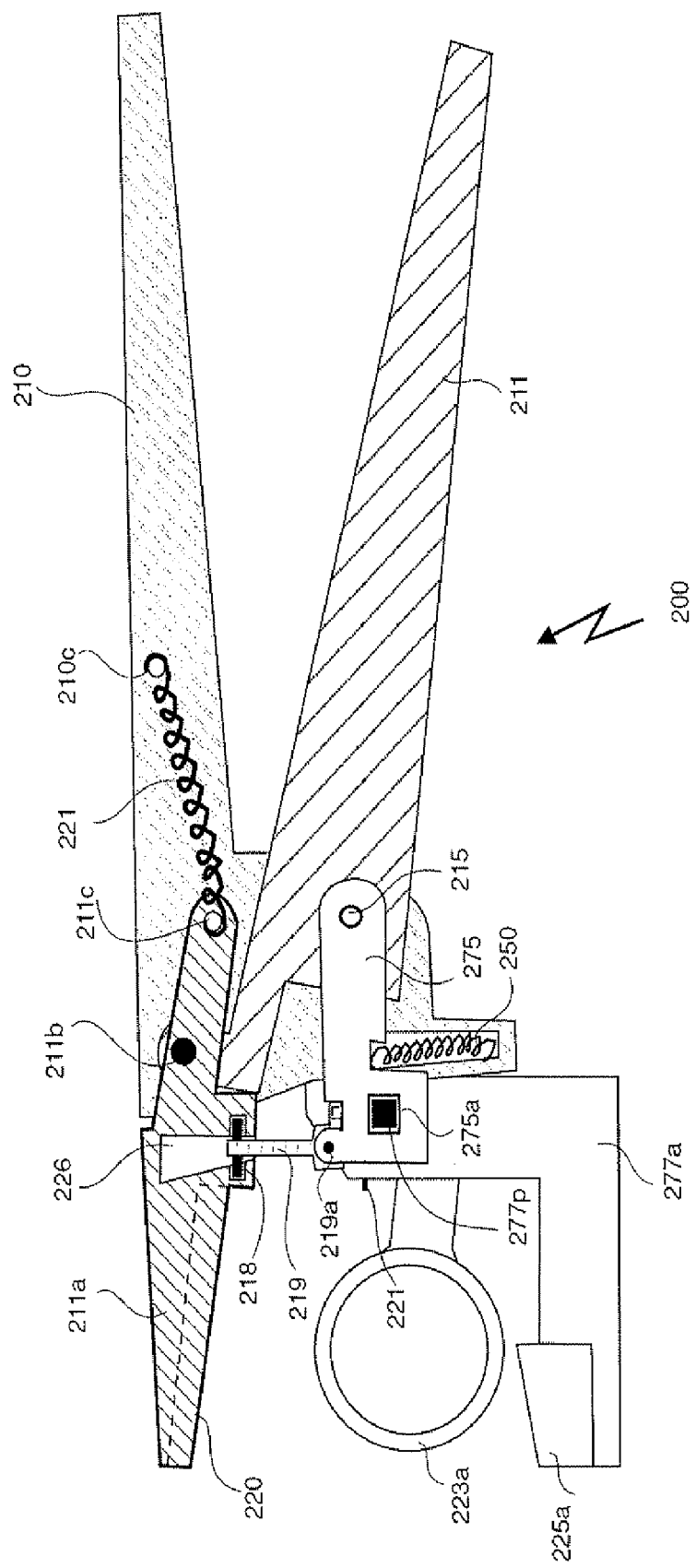
FIG. 6 illustrates combined side and cross sectional views of a device according to the present invention having a second embodiment of a catch mechanism.

In this position, further pressing together the handles (10) (11) will result in compression of the second spring (50) against the bottom of the now immovable toothed comb (81), forcing the toothed surface (85) of each of the arms (77a) (77b) to move upwardly respective to the toothed comb (81). Since the toothed surfaces (85) are geared to the toothed comb (81), their respective motion will result in outward rotation of the arms (77a) (77b) to opposite directions about their respective hinging pins (121). This outward rotation will break the shell apart, and release the content of the egg, FIG. 6 illustrates combined side and cross sectional views of a device of the present invention having a catch mechanism according to a second embodiment. The device comprises handles (210) and (211) hinged by a central hinge (215). A pivoting front portion (211a) of the handle (211) constitutes a sensing element (220), which is connected only to the handle (211) by a pin (211b) in a manner such that it may pivot about the pin within a predetermined pivoting extent respective to the handle (211). A tensioning spring (221) is connected between a rear connection point (211c) of the sensing element (220) and a connection point (210c) located on the next handle (210). The spring (221) is biasing the sensing element (220) such that it will normally remain in the illustrated position with the sensing element (220) pivoted counter-clockwise to the maximum, closer to a contact with an egg to be cracked. In this position a catch plate (218) located in the pivoting front portion (211a) of the handle (211) is in substantially perpendicular orientation to a screw (219) which can freely pass through a hole in the catch plate (218). The screw (219) is hinged by a pin (219a) passing through its head to a front of an actuation member (275). The actuation member is hinged on its rear portion to the central hinge (215) in a manner allowing it to pivot about the central hinge (215). Normally the actuation member (215) is kept in its maximum allowed clockwise position under pressure of a compressible spring (250) accommodated in a cavity formed in a front bottom portion of the upper handle (210). In this position, the screw (219) can freely pass through the catch plate (218) and entirely enter the cavity (226) formed for receiving it in the pivoting front portion (211*a*) upon pressing together the handles (210) and (211). The screw (219) would only partially enter through the catch plate (218) if the sensing element (220) has contacted an egg to be cracked in position between the ring holders (223*a*)(223*b*). Such contact is depicted in the following FIG. 7.

Figure 7:
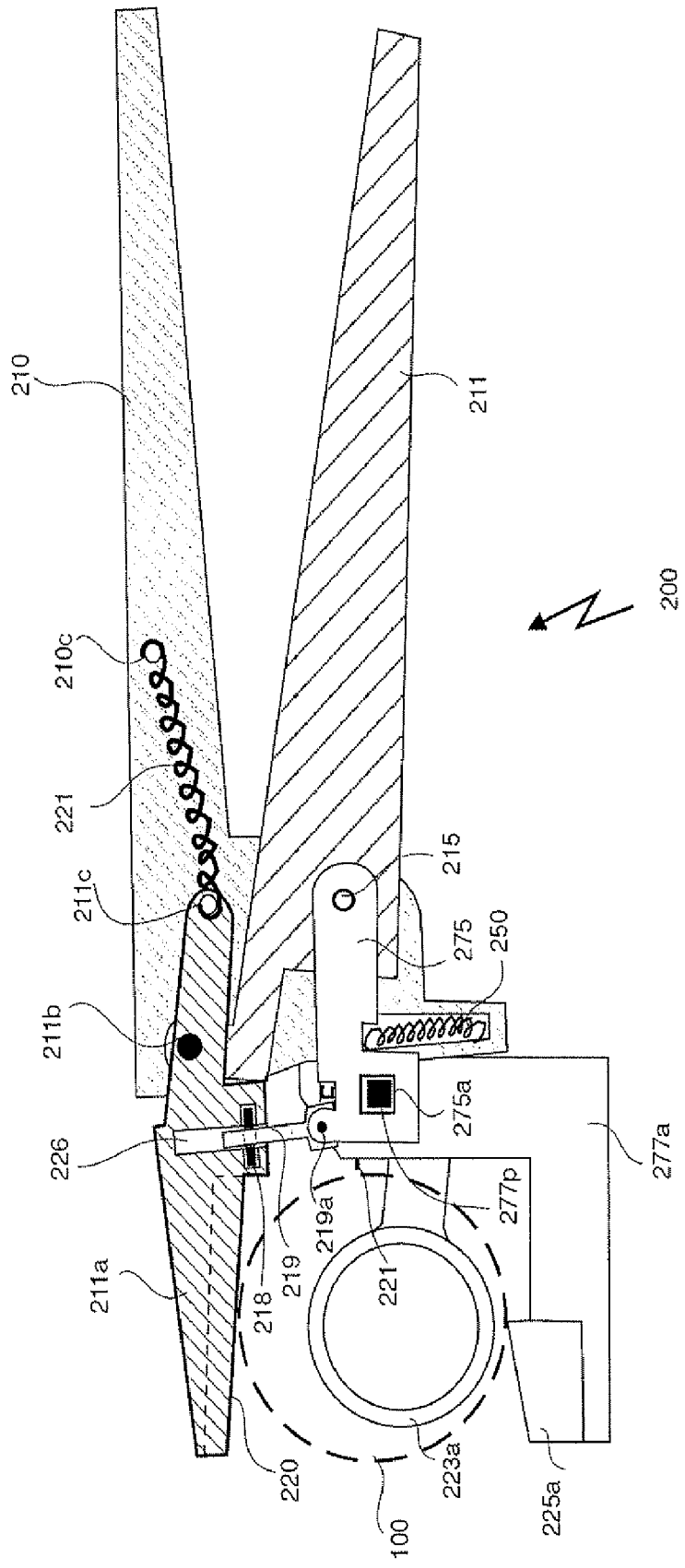
FIG. 7 illustrates the position of the catch mechanism of FIG. 6 in the moment an egg to be cracked has been contacted by the sensing element.

FIG. 7 illustrate the position of the catch mechanism of FIG. 6 in the moment an egg (100) to be cracked has been contacted by the sensing element (220). The egg is positioned right above the piercing members (225*b*) (not shown in this Fig.) and (225*a*), gripped by the ring shaped holders (223*b*) (not shown in this Fig.) and (223*a*). As can be appreciated, further pressing together the handles (210)(211) beyond the illustrated position will press the egg between the sensing element (220) and the piercing members 225*b*) (not shown in this Fig.) and (225*a*). Since the piercing members are formed quite sharper than the lower edge of the sensing element (220), the pressure of the latter on the shell will push the egg toward the piercing members which in turn will pierce it, as shown in the next FIG. 8, while slightly sliding the egg to a more centralized position among the ring shaped holders (223*a*) and (223*b*).

The ring shaped holders (223*a*) and (223*b*) are located in an average position from above the piercing members, with an imaginary line connecting between their lower points passing about one millimeter from above the top of the piercing member (225*a*). Furthermore, the ring shaped holders (223*a*) and (223*b*) preferably have slight freedom or elasticity in their vertical position respective to the piercing members, additionally to their elasticity in the lateral direction. They are designed to hold the eggs with their longitudinal axes tend back toward the device as depicted in FIG. 7, such that upon a pressure directed on their shell from the edge of the sensing element (220), they will slightly move down with the egg gripped in between against the piercing members to the position illustrated by FIG. 8, thus making the piercing. Minor forward movement of the eggs due to said initial back position of their axes may also occur simultaneously during the piercing, making the piercing even easier.

Figure 8:
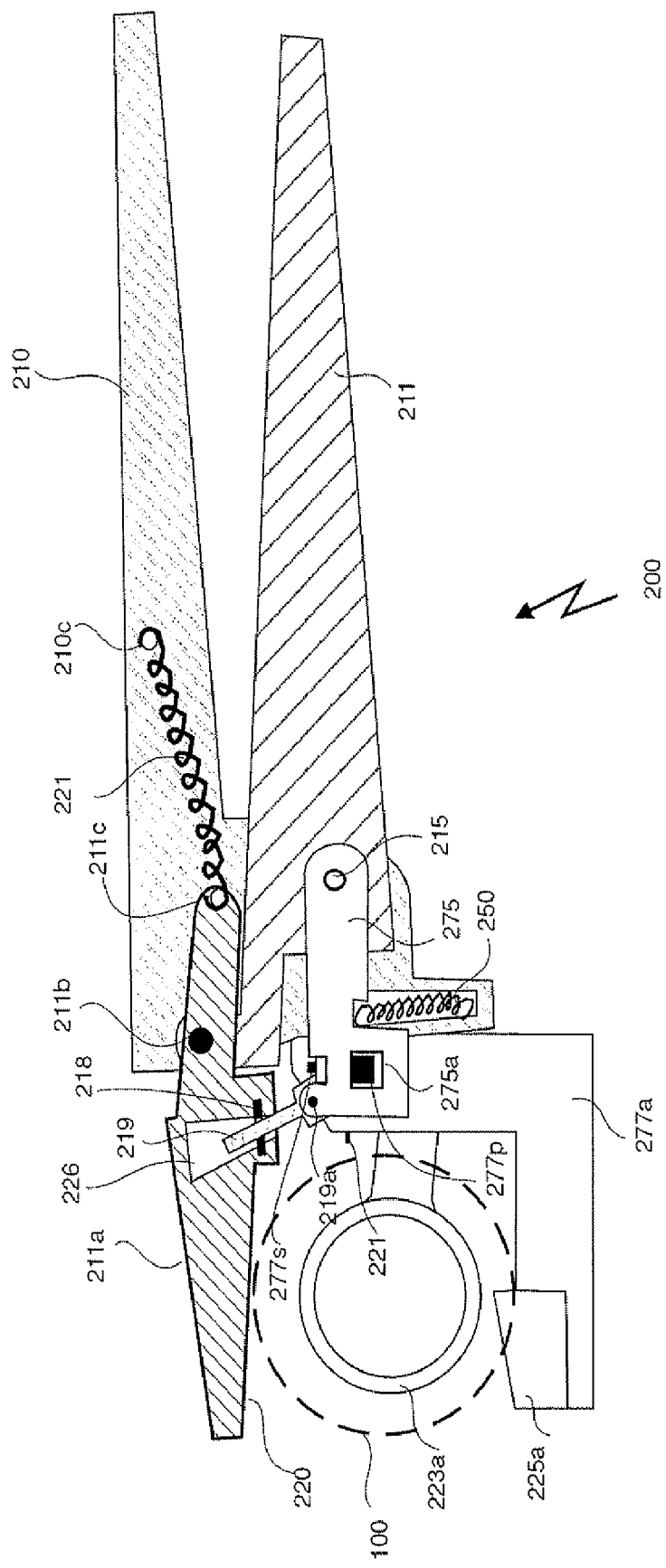
FIG. 8 illustrates the change in position of the catch mechanism of FIG. 6 in the moment an egg to be cracked has been sensed by the sensing element and the catch mechanism has activated an advanced mode of operation.

FIG. 8 illustrate the change in position of the catch mechanism of FIG. 6 in the moment an egg to be cracked has been sensed by the sensing element and the catch mechanism has activated an advanced mode of operation. Simultaneously with the piercing and due to the contact pressure between the sensing element (221) and the shell of the egg (100), the pivoting front portion (211*a*) is pivoting clockwise while slightly tensioning the spring (221), to the illustrated position. As can be appreciated, said pivoting repositions the catch plate (218) in a substantial inclined orientation respective to the screw (219), thereby locking the screw (219) and making it immovable through the plate (218). It is therefore understood that further pressing together the handles (210)(211) from the illustrated position, may only result in pushing the actuation member (275) by the screw (219) counterclockwise about the central hinge (215) against the compressible spring (250). The consequences of such push of the actuation member (275) make the difference between FIG. 10 which corresponds to an end of the push, and FIG. 9 which corresponds to before its start. A first result of the down movement of the actuation member (275) is the removal of the side walls (275*c*) from against the protrusions (277*s*), thus making an outward rotation of the arms possible.

FIG. 9 illustrates a partial front view of a screw mechanism constituting a part of the catch mechanism of FIG. 6. The two piercing members (225*a*)(225*b*) are shown upwardly protruding from respective lower ends of the arms (277*a*)(277*b*). The arms (277*a*)(277*b*) are hinged by pins (281*a*)(281*b*) respectively, to a front portion of the upper handle (210), and are kept together with the piercing members (225*a*)(225*b*) close one to another due to protrusions (277*s*) which are in position against respective side walls (275*c*) of the actuation member (275) thus blocking outward rotation of the arms (277*a*)(277*b*) about their axes. This is the position of the arms whenever the actuation member (275) is in its uppermost position due to the pressure exerted on it from below by the compressible spring (250). The arms (277*a*)(277*b*) further comprise respective arm levers (277*p*), which are located inside a cavity (275*a*) passing through the actuation member (275). When the actuation member (275) is fully up, a bottom of its cavity (275*a*) presses against the bottoms of the arm levers (277*p*), thus helping in maintaining the piercing members (225*a*)(225*b*) together.

FIG. 10 illustrates the partial front view of the screw mechanism of FIG. 9 in the end of a final mode of operation. In the final mode of operation, the screw (219) is locked to the catch plate (218) (not shown in this Fig.) such that pressing the handles together pushes the actuation member (275) down against the compressible spring (250) as indicated by the arrow (298). The down movement of the actuation member (275) removes the blocking side walls (275*c*) from against the protrusions (277*s*). Simultaneously, the sensing element presses the egg against the piercing members (225*a*)(225*b*) and the shell becomes pierced, then slightly cracked, by meeting with the base from which the piercing members protrude. The arms (277*a*)(277*b*) are provided with respective arm levers (277*p*) protruding into a cavity (275*a*) formed through the actuation member (275). In their closed position the bottom of the cavity (277*a*) presses the arm levers (277*p*) from below, thus keeping them together. Upon the down movement of the actuation member (275), not only the side walls are removed from against the protrusions (277*s*), the top (275*b*) of the cavity (275*a*) starts to move toward the top of the arm levers (277*p*). While the top (275*b*) thus moves, and before it contacts the arm levers, the piercing members are piercing the egg which is pushed against them by the sensing element pressing it from above. Immediately following the piercing, the top (275*b*) of the cavity (275*a*) contacts the tops of the arm levers (277*p*) from above, pressing them down. The down motion of the actuation member (275) thus been converted into outside rotations of the arms (277*a*)(277*b*) about their respective axes (281*a*)(281*b*) as indicated by the arrows (299*a*)(299*b*). It is appreciated that an egg shell previously pierced by the piercing members (225*a*)(225*c*) will be cracked apart upon such rotation, releasing its content into a cup (not illustrated) located below the arms (277*a*)(277*b*).

Returning the actuation member (275) up will reverse the rotation of the arms by pressing on the arm levers (277*p*) from below, until recovery of the position illustrated by FIG. 9.

FIG. 11 illustrates a front view of the sensing element (220) of the embodiment of FIG. 6. The bottom edge of the sensing element (220) is preferably of about 1 millimeter width, which is sufficiently wide to insure that the shell of the egg will be pierced by the piercing members and not by the sensing element yet is narrow enough for making a break line on the shell's apex thus assisting in breaking the shell apart by rotation of the arms (277a)(277b). Preferably the side walls (220a) (220b) of the pivoting front portion (221a) which extend upwardly from the sides of the sensing element (220) form an angle of about 86 degrees in between, which leaves appropriate space for the broken apart parts of the shell during their outward rotation following the arms (277a)(277b).

FIG. 12 illustrate a front view of the elements interacting with the egg (100) according to the embodiment of FIG. 6. These include the sensing element (220) which is also used for pressing the egg from above against the piercing members (225a)(225b) until they pierce into the shell, and preferably until the bottom of the shell is pressed also against the arm portions (277d) adjacent the piercing members (225a)(225b) in order to form a crack along the bottom of the shell, thus facilitating its breaking apart by the outside rotation of the arms to follow. Preferably, the ring shaped holders (223a) (223b) are provided in an inclined orientation as illustrated. A typical distance between the apexes of the holders may be 38 millimeters while the distance between their bottoms is 34 millimeters, thus providing the desired inclination, however, the invention is not so limited to these dimensions.

FIG. 13 illustrates a partial combined side and cross sectional view of a catch mechanism according to a third embodiment of the invention. A sensing element (320) is shown in a typical initial position, a few millimeters above an egg (100) gripped between ring shaped holders (323a). The bottom of the egg is positioned right above a pair of piercing members (325a)(325b). The sensing element has a slider (320s) adapted for sliding about a matching front surface (319d) of a toothed body (319) having a toothed surface (319a) on its back. The toothed body is connected to an actuation member (375) having a flexible protrusion (350) and a bottom end protrusion (319e). The toothed surface (319a) is located in front of a catch protrusion (318) which is integral to a back portion of the sensing element (320). The sensing element (320) further comprise on its back a flexible protrusion (321) acting similar to the spring (221) of FIG. 6 and configured to maintain the sensing element close to the apex of the egg to be cracked. The device has two handles (not illustrated) equivalent to the handles (210) (211) of FIG. 6, wherein the sensing element (320) is associated with a front portion of a lower handle and the actuation member (375) is associated with a front portion of an upper handle, in a manner similar to the respective association between the sensing element (220) and the lower handle (211) and between the actuation member (275) and the upper handle (210), in the embodiment of FIG. 6. Upon pressing the handles together, the slider (320s) slides down the matching surface (319d) and the existing gap between the sensing element (320) and the top of the piercing members (325a)(325b) is reduced, until the sensing element (320) contacts the apex of the egg (100). When this occurs, the pressure between the surface of the egg (100) and the sensing element (320) pushes the egg down toward the piercing members (325a)(325b) which pierce into the shell, while pushing the sensing element backwards and changing the mutual orientation between the slider (320s) and the matching surface (319d) to the non-overlapping state illustrated in FIG. 14. This is in contrast to the overlapping between the slider (320s) and the matching surface (319d) shown in FIG. 13. In the non-overlapping state, a free end of the catch protrusion (318) becomes stuck and locked between teeth of the toothed surface (319a) thus preventing further relative motion between the sensing element (320) and the actuation member (375) and preventing further reduction in the gap between the sensing element (320) and the piercing members (325a)(325b).

FIG. 14 illustrates the embodiment of FIG. 5 in the moment an egg to be cracked has been sensed by the sensing element and the catch mechanism has activated an advanced mode of operation. In the advanced mode of operation, the catch protrusion (318) can move only until being blocked between teeth of the toothed surface (319a), which allows for a reduction in the gap between the sensing element and the top of the piercing members (325a)(325b) no more than required for piercing into the egg. Further pressing the handles together can no more reduce said gap, and can only result in pressing the bottom end protrusion (319e) of the actuation member against a biasing force of the flexible protrusion (350) for actuating a mechanism for rotating the arms outwards, e.g. of the type illustrated in FIGS. 9-10, with the bottom end protrusion (319e) playing the role of the top (275b) of the cavity (275a) in pressing the arm levers.

The invention claimed is:

1. A device for cracking open an egg, comprising:
   handles;
   at least two piercing members;
   at least one egg-size sensing element coupled to at least one of the handles for determining the size of an egg positioned in the device;
   a catch mechanism coupled to the egg-size sensing means for determining how much, upon pressing the handles together, would a distance between the piercing members and an imaginary longitudinal axis of the egg be reduced before the piercing members stop their advancing towards the egg and start moving apart for cracking its shell open, thereby automatically calibrating the device to a specific size of an egg to be cracked; and
   a pair of ring shaped holders positioned in an inclined orientation to an imaginary longitudinal axis of an egg held by said ring shaped holders, such that a distance between apexes of said holders is greater than a distance between their bottom ends.

* * * * *